United States Patent [19]

Versnel

[11] 3,893,970

[45] July 8, 1975

[54] FIRE RETARDANT POLYPROPYLENE COMPOSITIONS CONTAINING A HALOGENATED FLAME RETARDANT AND A PHOSPHITE ADJUVANT

[75] Inventor: John Versnel, Plainsboro, N.J.

[73] Assignee: Cities Service Company, Tulsa, Okla.

[22] Filed: Aug. 27, 1973

[21] Appl. No.: 391,901

Related U.S. Application Data

[63] Continuation-in-part of Ser. No. 185,832, Oct. 1, 1971, abandoned.

[52] U.S. Cl................260/45.75 K; 260/45.7 P; 260/45.75 B; 260/45.8 N; 260/45.8 R
[51] Int. Cl.......................... C08f 45/54; C09k 3/28
[58] Field of Search ..... 260/45.7 P, 45.8 R, 45.8 N, 260/45.75

[56] References Cited
UNITED STATES PATENTS

| | | | |
|---|---|---|---|
| 2,550,744 | 5/1951 | Wilder et al. | 260/346.3 |
| 2,576,080 | 11/1951 | Tischler et al. | 260/346.3 |
| 2,795,589 | 6/1957 | Bluestone | 260/326 |
| 3,047,608 | 7/1962 | Friedman et al. | 260/927 |
| 3,280,143 | 10/1966 | Hayes | 260/326 |
| 3,283,037 | 11/1966 | Davis | 260/927 |
| 3,313,763 | 4/1967 | Creighton et al. | 260/41 |
| 3,398,115 | 8/1968 | Hecker et al. | 260/45.85 |
| 3,666,692 | 5/1972 | Paige et al. | 260/2.5 |
| 3,749,694 | 7/1973 | Cantatore et al. | 260/45.7 P |
| 3,781,388 | 12/1973 | Jenkner et al. | 260/45.7 P |
| 3,786,023 | 1/1974 | Dotson et al. | 260/45.8 N |

OTHER PUBLICATIONS

Bartlett et al., JACS, Vol. 68, 1946, pp. 6 and 7.
Hilado, "Flammability Handbook for Plastics", 1969, pp. 85 and 86.

*Primary Examiner*—Ronald W. Griffin
*Attorney, Agent, or Firm*—Patricia J. Hogan

[57] ABSTRACT

A phosphite adjuvant is used to enhance the flame retardancy of a polypropylene composition containing a primary flame retardant which comprises (A) a halogenated cyclic imide and (B) optionally also a metal oxide or sulfide. The adjuvant is an organic phosphite containing not more than one aromatic radical per phosphorus atom, e.g., distearyl pentaerythritol diphosphite, diisodecyl pentaerythritol diphosphite, etc.

10 Claims, No Drawings

FIRE RETARDANT POLYPROPYLENE COMPOSITIONS CONTAINING A HALOGENATED FLAME RETARDANT AND A PHOSPHITE ADJUVANT

CROSS-REFERENCE TO RELATED APPLICATION

This application is a continuation-in-part of copending application Ser. No. 185,832, filed Oct. 1, 1971, now abandoned.

BACKGROUND OF THE INVENTION

1. Field of the Invention

This invention relates to self-extinguishing polypropylene compositions and more particularly relates to such compositions containing a halogenated flame retardant and a phosphite adjuvant.

2. Description of the Prior Art

It is known that polypropylene may be rendered self-extinguishing by the incorporation of a halogenated flame retardant. As disclosed in copending application Ser. No. 183,696, filed Sept. 24, 1971, in the names of Anderson O. Dotson, Jr., Jack Newcombe, and Linonel T. Wolford (now U.S. Pat. 3,784,509), particularly good results are obtained when the halogenated flame retardant is one of certain halogenated cyclic imides. The effectiveness of such a flame retardant may be increased by the incorporation of antimony trioxide or the like as a synergist. However, since these conventional synergists, like the halogenated compounds, may have a deleterious effect on polymer properties, it would obviously be desirable to find another type of material capable of enhancing the flame retardant effect of the halogenated cyclic imides.

SUMMARY OF THE INVENTION

An object of this invention is to enhance the flame retardancy of a polypropylene composition containing a flame retardant which comprises a halogenated cyclic imide.

Another object is to provide such an enhancement of flame retardancy with a novel flame retardant adjuvant.

These and other objects are attained by blending polypropylene and the flame retardant with about 5–95%, based on the weight of the halogenated cyclic imide, of an organic phosphite flame retardant adjuvant containing not more than one aromatic radical per phosphorus atom.

DESCRIPTION OF THE PREFERRED EMBODIMENTS

The self-extinguishing polypropylene compositions which are improved in accordance with the invention are those wherein the flame retardant comprises a halogenated cyclic imide corresponding to the formula:

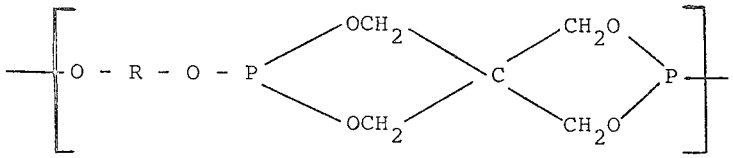

wherein Z is a hydrocarbon, chlorinated hydrocarbon, or brominated hydrocarbon radical, R is hydrogen or methyl, Q is methylene or oxygen, and $n$ is an integer of 0–1. Z may be alkyl, alkenyl, aryl, aralkenyl, aralkyl, alkaryl, or cycloaliphatic or a halogenated derivative of such radicals but is preferably phenyl, bromophenyl, tolyl, benzyl, or 2,3-dibromopropyl. The preferred imides are those in which R is hydrogen, Q is methylene, and $n$ is 1. These imides and methods for preparing them are more fully disclosed in the aforementioned copending application Ser. No. 183,696, the teachings of which are incorporated herein by reference. The compositions of the invention usually contain about 0.5–20%, preferably about 3–16%, of the halogenated cyclic imide, based on the weight of polypropylene.

The halogenated cyclic imide may be the sole component of the primary flame retardant, or it may be present in conjunction with a synergist. When the presence of at least some metal compound in the composition is tolerable, it is often advantageous for the compositions of the invention to contain about 20–100%, preferably about 40–60%, of a conventional metal compound synergist, based on the weight of the halogenated cyclic imide. These metal compound synergists, of course, are well known. They may be organometallic compounds but are usually oxides or sulfides of a polyvalent metal such as antimony, arsenic, bismuth, tin, or titanium. Of these metal compounds utilizable as components of the primary flame retardants in the compositions of the invention, antimony trioxide is preferred.

The phosphite employed in accordance with the invention may be any organic phosphite containing not more than one aromatic radical per phosphorus atom, e.g., a phosphite corresponding to the formula $P(QR)(QR')(QR'')$ in which Q is oxygen or sulfur, R and R' are aliphatic or cycloaliphatic hydrocarbon radicals, and R'' is an aliphatic, cycloaliphatic, or aromatic hydrocarbon radical. Such phosphites include, for example, trimethyl phosphite, trihexyl trithiophosphite, diisodecyl phenyl phosphite, poly(bisphenol A pentaerythritol diphosphite) having a D.P. of 2–3, other polymeric phosphites containing the recurring unit:

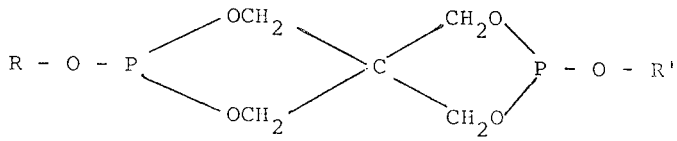

wherein R is a hydrocarbon or hydrocarbonoxy radical containing 1–20 carbon atoms, etc. However, the preferred phosphites are trialkyl phosphites and thiophosphites wherein the alkyl groups contain 10–20 carbon atoms (e.g., tridecyl phosphite, trilauryl trithiophosphite, tricetyl trithiophosphite, tristearyl phosphite, etc.), phosphites corresponding to the formula:

$$R - O - P\begin{pmatrix}OCH_2\\OCH_2\end{pmatrix}C\begin{pmatrix}CH_2O\\CH_2O\end{pmatrix}P - O - R'$$

wherein R and R' are hydrocarbon radicals containing 1–20 carbon atoms (e.g., distearyl pentaerythritol diphosphite, dicetyl pentaerythritol diphosphite, ditetradecyl pentaerythritol diphosphite, diisodecyl pentaerythritol diphosphite, dibutyl pentaerythritol diphosphite, methyl stearyl pentaerythritol diphosphite, etc.), and phosphites corresponding to the formula:

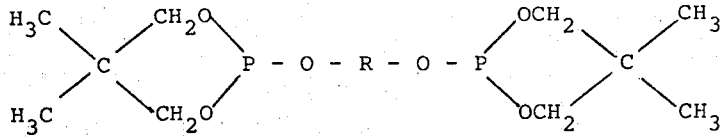

wherein R is a hydrocarbon or hydrocarbonoxy radical containing 1–20 carbon atoms (e.g., bis(t-pentyl glycol) 1,4-cyclohexanedimethylene diphosphite, bis(t-pentyl glycol) triethyleneglycol diphosphte, bis(t-pentyl glycol) methylene diphosphite, etc.)

Generally the phosphites contain 1–6 phosphorus atoms and 6–60 carbon atoms per phosphorus atom. The phosphite may not contain more than one aromatic radical per phosphorus atom because phosphites, e.g., triphenyl phosphite, are inoperative in the practice of the invention. The compositions of the invention contain about 5–95%, preferably about 50–90%, of the phosphite, based on the weight of the halogenated cyclic imide.

Although the compositions of the invention may be prepared by any suitable technique, they are usually prepared by mixing the additives with molten polypropylene to provide an intimate admixture.

The use of the organic phosphite in the composition of the invention enhances the flame retardancy of the compositions and thus makes it possible to eliminate or reduce the amount of metal compound synergist usually employed in such compositions to obtain an optimum level of flame retardancy.

The following examples are given to illustrate the invention and are not intended as a limitation thereof. Unless otherwise specified, quantities are quantitites by weight.

EXAMPLE I — CONTROL

Blend 88.25 parts of polypropylene having an oxygen index of 18.0 with 11.75 parts of N-phenyl-5,6-dibromonorbornane-2,3-dicarboximide. The composition has an oxygen index of 21.9.

EXAMPLE II

Part A — Control

Blend 88.25 parts of the polypropylene of Example I with 11.75 parts of diisodecyl pentaerythritol diphosphite. The composition has an oxygen index of 19.9.

Part B

Prepare 10 compositions by blending 88.25 parts of the polypropylene of Example I with 11.75 parts of a mixture of the imide of Example I and the phosphite of Part A. The amounts of imide and phosphite used in each of the compositions and the oxygen indices of the compositions are shown below.

| Composition | Imide | Phosphite | O.I. |
|---|---|---|---|
| II-B-1 | 11.40 | 0.35 | 23.0 |
| II-B-2 | 10.00 | 1.75 | 24.8 |
| II-B-3 | 9.00 | 2.75 | 24.3 |
| II-B-4 | 8.25 | 3.50 | 24.8 |
| II-B-5 | 7.84 | 3.91 | 23.9 |
| II-B-6 | 7.35 | 4.40 | 24.8 |
| II-B-7 | 6.92 | 4.83 | 25.5 |
| II-B-8 | 6.52 | 5.23 | 25.2 |
| II-B-9 | 6.20 | 5.55 | 24.6 |
| II-B-10 | 5.88 | 5.87 | 24.3 |

EXAMPLE III

Part A — Control

Blend 88.25 parts of the polypropylene of Example I with 11.75 parts of distearyl pentaerythritol disphosphite. The composition has an oxygen index of 19.5.

Part B

Prepare seven compositions by blending 88.25 parts of the polypropylene of Example I with 11.75 parts of a mixture of the imide of Example I and the phosphite of Part A. The amounts of imide and phosphite used in each of the compositions and the oxygen indices of the compositions are shown below.

| Composition | Imide | Phosphite | O.I. |
|---|---|---|---|
| III-B-1 | 11.40 | 0.35 | 22.3 |
| III-B-2 | 10.00 | 1.75 | 23.8 |
| III-B-3 | 9.00 | 2.75 | 23.0 |
| III-B-4 | 7.84 | 3.91 | 24.3 |
| III-B-5 | 7.35 | 4.40 | 24.6 |
| III-B-6 | 6.92 | 4.83 | 24.3 |
| III-B-7 | 6.52 | 5.23 | 24.3 |

EXAMPLE IV

Part A — Control

Blend 88.25 parts of the polypropylene of Example I with 11.75 parts of trilauryl trithiophosphite. The composition has an oxygen index of 20.5.

Part B

Prepare eight compositions by blending 88.25 parts of the polypropylene of Example I with 11.75 parts of a mixture of the imide of Example I and the phosphite of Part A. The amounts of imide and phosphite used in each of the compositions and the oxygen indices of the compositions are shown below.

| Composition | Imide | Phosphite | O.I. |
|---|---|---|---|
| IV-B-1 | 11.40 | 0.35 | 23.0 |
| IV-B-2 | 10.00 | 1.75 | 23.4 |
| IV-B-3 | 9.00 | 2.75 | 23.0 |
| IV-B-4 | 7.84 | 3.91 | 23.0 |
| IV-B-5 | 7.35 | 4.40 | 23.0 |
| IV-B-6 | 6.92 | 4.83 | 23.0 |
| IV-B-7 | 6.52 | 5.23 | 22.7 |
| IV-B-8 | 5.88 | 5.87 | 23.0 |

EXAMPLE V

Part A — Control

Blend 88.25 parts of the polypropylene of Example

I with 11.75 parts of tristearyl phosphite. The composition has an oxygen index of 18.8.

Part B

Prepare seven compositions by blending 88.25 parts of the polypropylene of Example I with 11.75 parts of a mixture of the imide of Example I and the phosphite of Part A. The amounts of imide and phosphite used in each of the compositions and the oxygen indices of the compositions are shown below.

| Composition | Imide | Phosphite | O.I. |
| --- | --- | --- | --- |
| V-B-1 | 11.40 | 0.35 | 22.7 |
| V-B-2 | 10.00 | 1.75 | 23.8 |
| V-B-3 | 9.00 | 2.75 | 23.0 |
| V-B-4 | 7.84 | 3.91 | 23.0 |
| V-B-5 | 7.35 | 4.40 | 24.3 |
| V-B-6 | 6.92 | 4.83 | 23.8 |
| V-B-7 | 6.52 | 5.23 | 23.8 |

EXAMPLE VI

Part A — Control

Blend 88.25 parts of the polypropylene of Example I with 11.75 parts of diisodecyl phenyl phosphite. The composition has an oxygen index of 19.9.

Part B

Prepare eight compositions by blending 88.25 parts of the polypropylene of Example I with 11.75 parts of a mixture of the imide of Example I and the phosphite of Part A. The amounts of imide and phosphite used in each of the compositions and the oxygen indices of the compositions are shown below.

| Composition | Imide | Phosphite | O.I. |
| --- | --- | --- | --- |
| VI-B-1 | 11.40 | 0.35 | 23.4 |
| VI-B-2 | 10.00 | 1.75 | 23.8 |
| VI-B-3 | 9.00 | 2.75 | 24.3 |
| VI-B-4 | 8.25 | 3.50 | 24.3 |
| VI-B-5 | 7.84 | 3.91 | 23.8 |
| VI-B-6 | 7.35 | 4.40 | 24.3 |
| VI-B-7 | 6.92 | 4.83 | 24.6 |
| VI-B-8 | 6.52 | 5.23 | 24.3 |

EXAMPLE VII

Part A — Control

Blend 93 parts of the polypropylene of Example I with 7 parts of a 4/3 mixture of the imide of Example I and antimony trioxide. The composition has an oxygen index of 27.2.

Part B

Blend 93 parts of the polypropylene of Example I with 7 parts of distearyl pentaerythritol diphosphite. The composition has an oxygen index of 19.9.

Part C

Blend 93 parts of the polypropylene of Example I with 7 parts of a 4/2/1 mixture of the imide of Example I, antimony trioxide, and distearyl pentaerythritol diphosphite. The composition has an oxygen index of 27.5.

EXAMPLE VIII

Prepare two compositions by repeating Example VII, Part C, except for replacing the distearyl pentaerythritol diphosphite with diisodecyl pentaerythritol diphosphite and tristearyl phosphite, respectively. The compositions have respective oxygen indices of 28.4 and 27.5.

EXAMPLE IX — CONTROL

Blend 88.25 parts of the polypropylene of Example I with 11.75 parts of N-propyl-5,6-dibromonorbornane-2,3-dicarboximide. The composition has an oxygen index of 22.7.

EXAMPLE X

Prepare two compositions by blending 88.25 parts of the polypropylene of Example I with 11.75 parts of a mixture of the imide of Example IX and the phosphite of Example II in imide/phosphite ratios of 11.40/0.35 and 9.00/2.75. The first composition has an oxygen index of 23.4; the second has an oxygen index of 24.3.

Similar results are observed when the other halogenated cyclic imides and phosphites described in the specification are substituted for those used in the Examples.

It is obvious that many variations may be made in the products and processes set forth above without departing from the spirit and scope of this invention.

What is claimed is:

1. A composition comprising:
   A. polypropylene,
   B. a primary flame retardant comprising a halogenated cyclic imide corresponding to the formula:

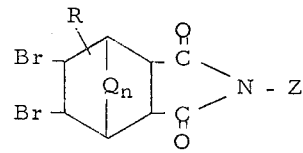

wherein Z is a hydrocarbon, chlorinated hydrocarbon, or brominated hydrocarbon radical, R is hydrogen or methyl, Q is methylene or oxygen, and $n$ is an integer of 0–1, and C. about 5–95%, based on the weight of the halogenated cyclic imide, of an organic phosphite flame retardant adjuvant containing 1–6 phosphorus atoms, 6–60 carbon atoms per phosphorus atom, and not more than one aromatic radical per phosphorus atom; said phosphite being selected from the group consisting of:
   1. a phosphite corresponding to the formula P(QR')(QR')(QR'') in which Q is oxygen or sulfur, R and R' are aliphatic or cycloaliphatic hydrocarbon radicals, and R'' is an aliphatic, cycloaliphatic, or aromatic hydrocarbon radical,
   2. a phosphite corresponding to the formula:

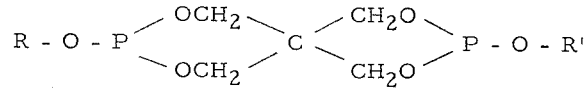

in which R and R' are hydrocarbon radicals containing 1–20 carbon atoms, and 3. a phosphite corresponding to the formula:

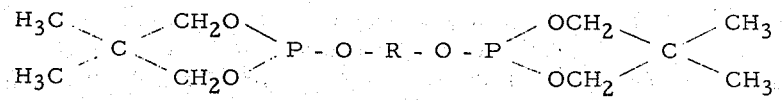

in which R is a hydrocarbon or hydrocarbonoxy radical containing 1–20 carbon atoms.

2. The composition of claim 1 wherein the concentration of phosphite is about 50–90%.

3. The composition of claim 1 wherein the halogenated cyclic imide corresponds to the formula:

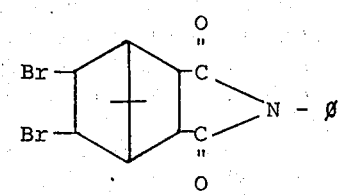

4. The composition of claim 1 wherein the flame retardant adjuvant is a phosphite corresponding to the formula P(QR)QR')(QR'') in which Q is oxygen or sulfur, R and R' are aliphatic or cycloaliphatic hydrocarbon radicals, and R'' is an aliphatic, cycloaliphatic, or aromatic hydrocarbon radical.

5. The composition of claim 4 wherein the flame retardant adjuvant is a trialkyl phosphite or thiophosphite in which the alkyl group contains 10–20 carbon atoms.

6. The composition of claim 1 wherein the flame retardant adjuvant is a phosphite corresponding to the formula:

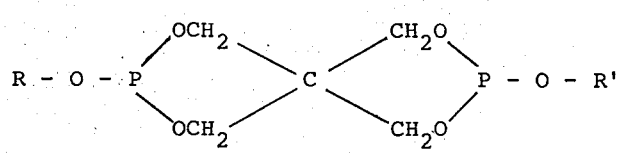

in which R and R' are hydrocarbon radicals containing 1–20 carbon atoms.

7. The composition of claim 6 wherein the flame retardant adjuvant is distearyl pentaerythritol diphosphite, dicetyl pentaerythritol diphosphite, ditetradecyl pentaerythritol diphosphite, or diisodecyl pentaerythritol diphosphite.

8. The composition of claim 1 wherein the flame retardant adjuvant is a phosphite corresponding to the formula:

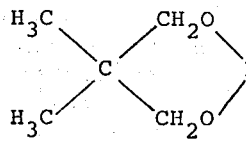 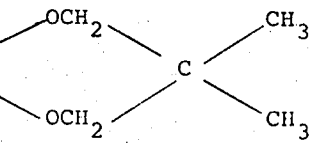

in which R is a hydrocarbon or hydrocarbonoxy radical containing 1–20 carbon atoms.

9. The composition of claim 8 wherein the flame retardant adjuvant is bis(t-pentyl glycol) 1,4-cyclohexanedimethylene diphosphite or bis(t-pentyl glycol)triethyleneglycol diphosphite.

10. The composition of claim 1 wherein the primary flame retardant also comprises an oxide or sulfide of antimony, arsenic, bismuth, tin or titanium.

* * * * *